(No Model.)

R. B. TAFFER.
PHOTOGRAPHIC PLATE HOLDER.

No. 499,763. Patented June 20, 1893.

Witnesses:
W. J. Sankey.
J. Ralph Orwig.

Inventor: Robert B. Taffer,
By Thomas G. Orwig, Attorney.

THE NORRIS PETERS CO., PHOTO-LITHO., WASHINGTON, D. C.

UNITED STATES PATENT OFFICE.

ROBERT B. TAFFER, OF DES MOINES, IOWA.

PHOTOGRAPHIC-PLATE HOLDER.

SPECIFICATION forming part of Letters Patent No. 499,763, dated June 20, 1893.

Application filed February 21, 1893. Serial No. 463,285. (No model.)

*To all whom it may concern:*

Be it known that I, ROBERT B. TAFFER, a citizen of the United States of America, residing at Des Moines, in the county of Polk and State of Iowa, have invented an Improved Camera Attachment, of which the following is a specification.

My invention consists in the construction of a sliding frame adapted to be detachably and interchangeably connected with a camera, to replace the ordinary ground glass thereof, and in the arrangement therein of a ground glass and a reversible double plate holder and the construction and arrangement of devices for automatically drawing the slides of the plate holders at the same time the ground glass is removed from the opening in the rear of the camera, as hereinafter set forth, pointed out in my claim and illustrated in the accompanying drawings, in which—

Figure 1:
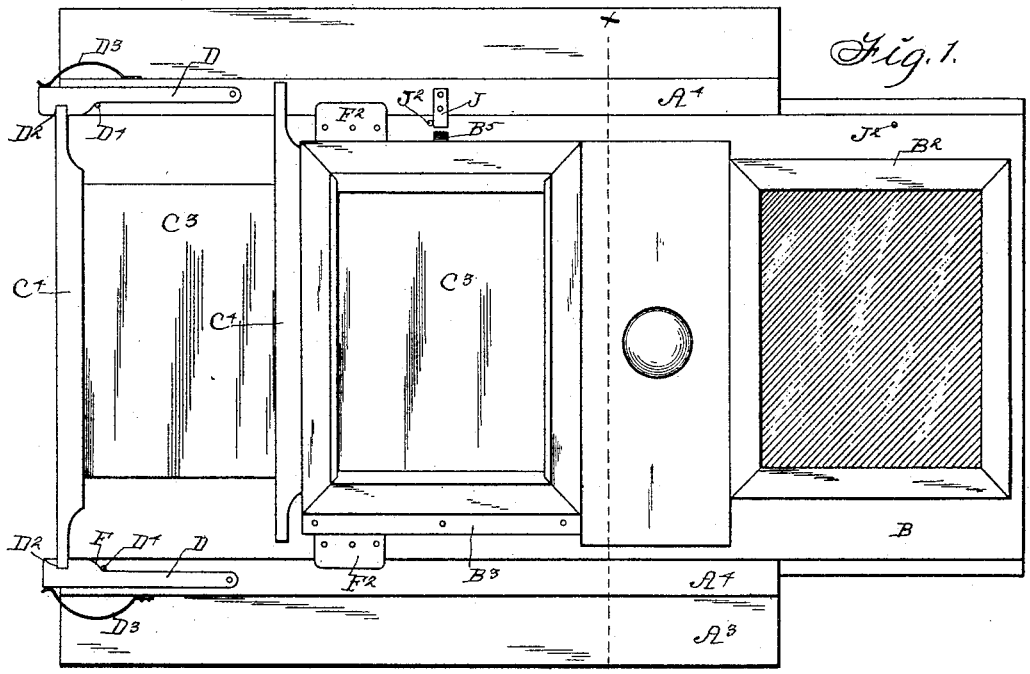
Figure 2:
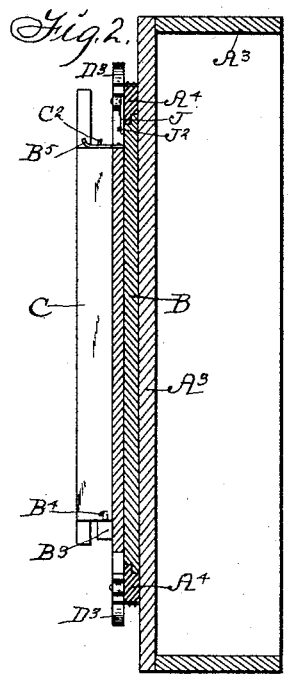
Figure 3:
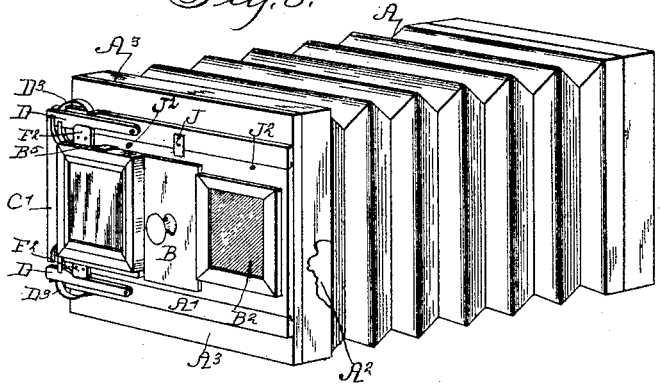

Figure 1 is a rear side view of the complete attachment. Fig. 2 is a vertical transverse sectional view through the line $x-x$ of Fig. 1. Fig. 3 shows in perspective a camera box with the attachment applied thereto as in practical use.

Referring to the accompanying drawings, the reference letter A is used to designate the camera box of which $A^2$ is the rear end piece. $A^3$ designates a frame adapted to be detachably connected with the rear end of the camera, and $A^4$ is a track extending horizontally along the frame $A^3$.

B designates a sliding frame adapted to move horizontally in the track $A^4$.

$B^2$ designates a ground glass permanently fixed over an opening in frame B.

$B^3$ is a strip secured to the bottom portion of the opposite end of the frame B.

$B^4$ are sharpened projections extending upwardly from said strip.

$B^5$ designates a spring metal clutching device secured to the top portion of the frame B directly above the strip $B^3$. Its outer end is curved upwardly and provided with perforations near its central portion for purposes hereinafter set forth.

C designates a double plate holder of the ordinary construction adapted to be detachably connected with the frame B, by means of perforations in its under edge adapted to receive the sharpened projections $B^4$ and a projection $C^2$ adapted to enter perforations in spring $B^5$. Each edge of the said double plate holder is provided with both a set of openings to admit the projections $B^4$ and a projection $C^2$ to engage the spring $B^5$ to provide for the reversal of the double plate holder C.

$C^3$ designates slides in the opposite sides of the double plate holder and $C^4$ are end pieces on the ends of said slides having ends which project above and below the horizontal plane of the plate holder. Means are provided for automatically drawing the inner slide $C^3$ from the plate holder at the same time that the ground glass $B^2$ is removed from the normal position coinciding with opening in the rear of the camera box as required to bring the plate in readiness for exposure, as follows:

D, D, designate two levers pivotally connected to the upper and lower portions of the track $A^4$ near the end thereof in juxtaposition to the plate holder and extending horizontally outward therefrom. $D^2$ designates notches formed in the inner faces of said levers D, adapted to admit the ends of the holders $C^4$. These levers are normally held inwardly, by means of the yielding pressure devices $D^3$, and their inward movement is restricted by means of the stops $D^4$. The inner corners of these levers D are rounded so that the ends of the holders $C^4$ will press the levers outwardly, as the holder is advanced, and allow the ends of the end pieces $C^4$ to enter the notches $D^2$ and be firmly held therein. The inner faces of the levers D are inclined at E, and $F^2$ designates blocks secured to the sliding frame B in such a manner that they will engage said inclined surfaces as the frame is being moved toward the end of the frame $K^3$ and separate the levers D as required to automatically release the end pieces $C^4$.

J designates an arm fixed to the frame $A^3$ and $J^2$, $J^2$, are stops fixed to the frame B to be engaged by said arm to limit the movement of the sliding frame relative to the stationary one. These stops are so disposed that the movement of the frame is stopped when the slide in the plate holder has been drawn to a point almost out of engagement with the plate holder and on the other side when the ground glass coincides with the opening in the rear of the camera box.

The practical operation of the device is as follows; the complete device is first placed on the rear of the camera box in lieu of the ordinary ground glass, the slide is then placed in position with the ground glass coinciding with the opening in the rear of the camera box. The double plate holder is then placed in the sliding frame and to prepare one of the plates for exposure the sliding frame is moved to the opposite side of the frame. This brings the plate in a position coinciding with the opening in the rear of the camera box and draws the slide at the same time. After the exposure is made the sliding frame is moved in the opposite direction which closes the slide and releases the end piece $C^4$ from engagement with the lever D.

Having thus described my invention, what I claim as new therein, and desire to secure by Letters Patent of the United States therefor, is—

In a camera attachment, the combination of the following elements, to wit; a frame $A^3$ adapted to be connected with the rear of a camera, a track $A^4$ fixed thereon, a sliding frame B in said track, a ground glass $B^2$ in one end of said sliding frame, a double plate holder C, means for detachably connecting said holder with the sliding frame as set forth, the slides $C^3$ in said plate holder and the end pieces $C^4$ on said slides, the levers D having the notches $D^2$, the springs $D^3$ and the stops $D^4$, the blocks $F^2$ to engage said levers for the purposes stated and the stops J and $J^2$ as set forth, for the purposes stated.

ROBERT B. TAFFER.

Witnesses:
R. H. ORWIG,
THOMAS G. ORWIG.